(12) United States Patent
Raymoure

(10) Patent No.: US 6,582,146 B2
(45) Date of Patent: Jun. 24, 2003

(54) BALL JOINT SEAL

(75) Inventor: David Raymoure, Royal Oak, MI (US)

(73) Assignee: TRW Inc., Lyndhurst, OH (US)

( * ) Notice: Subject to any disclaimer, the term of this patent is extended or adjusted under 35 U.S.C. 154(b) by 29 days.

(21) Appl. No.: 09/782,330

(22) Filed: Feb. 13, 2001

(65) Prior Publication Data

US 2002/0110407 A1 Aug. 15, 2002

(51) Int. Cl.[7] .................. F16J 15/52; F16J 3/00
(52) U.S. Cl. .................. 403/50; 403/51; 277/636
(58) Field of Search .................. 403/51, 56, 50, 403/122; 277/634, 635, 636

(56) References Cited

U.S. PATENT DOCUMENTS

| | | | |
|---|---|---|---|
| 1,959,259 A | | 5/1934 | Zerk |
| 2,304,732 A | * | 12/1942 | Flumerfelt .................. 403/51 |
| 3,262,706 A | | 7/1966 | Hassan |
| 3,279,832 A | * | 10/1966 | Bergman .................. 403/51 |
| 3,451,700 A | * | 6/1969 | Smith .................. 403/51 |
| 3,596,915 A | * | 8/1971 | Snidar .................. 403/51 |
| 4,003,667 A | | 1/1977 | Gaines et al. |
| 4,241,928 A | * | 12/1980 | Nemoto et al. .................. 277/212 FB |
| 4,447,066 A | * | 5/1984 | Katagiri et al. .................. 277/212 FB |
| 4,673,188 A | | 6/1987 | Matsuno et al. |
| 5,286,131 A | | 2/1994 | Wood |
| 5,380,114 A | | 1/1995 | Urbach |
| 5,413,431 A | | 5/1995 | Fellows |
| 5,568,930 A | | 10/1996 | Urbach |
| 5,695,202 A | | 12/1997 | Cartwright et al. |
| 6,308,959 B1 | * | 10/2001 | Sokolihs et al. .................. 403/51 |

FOREIGN PATENT DOCUMENTS

| | | | |
|---|---|---|---|
| DE | 1175493 | | 8/1964 |
| DE | 19727494 A1 | * | 6/1997 .................. 403/51 |
| FR | 1402467 | | 6/1965 |

OTHER PUBLICATIONS

European Search Report EP 02 00 3056.

* cited by examiner

Primary Examiner—Gregory J. Binda
Assistant Examiner—Victor MacArthur
(74) Attorney, Agent, or Firm—Tarolli, Sundheim, Covell & Tummino L.L.P.

(57) ABSTRACT

A ball joint (10) includes a socket (30) defining a pivot center (32), a bearing (38) in the socket (30), and a stud (40). The stud (40) has a ball end portion (42) received in the bearing (38) and a shank portion (50) projecting from the socket (30). The stud (40) further has a longitudinal axis (56) extending through the pivot center (32). The bearing (38) supports the stud (40) in the socket (30) for pivotal movement about the pivot center (32) and for rotational movement about the axis (56) by a predetermined amount. The ball joint (10) further includes an annular seal (70) having an intermediate portion (88) extending between first and second end portions (72, 74) of the seal (70). The seal (70) is made from an elastic material. The first end portion (72) is fixed to the socket (30). The second end portion (74) is fixed to the shank portion (50) and is pivotable and rotatable with the stud (40). The intermediate portion (88) has a plurality of flutes (111) that provide excess material to enable rotation of the stud (40) about the axis (56) relative to the socket (30) by the predetermined amount.

10 Claims, 4 Drawing Sheets

BALL JOINT SEAL

BACKGROUND OF THE INVENTION

1. Technical Field

The present invention relates to a ball joint and, in particular, to a seal for a ball joint.

2. Description of the Related Art

A typical ball joint includes a socket and a ball stud. The ball stud has a ball end portion received in the socket and a shank portion projecting from the ball stud. The socket supports the ball stud for pivotal and/or rotational movement relative to the socket with the shank portion extending from the socket. The ball joint also includes a seal that has a first end portion that seals against the socket. A second end portion of the seal seals against the shank portion of the ball stud. The seal prevents lubricant from coming out of the ball joint and also prevents dirt and other items from entering into the ball joint.

SUMMARY OF THE INVENTION

The present invention is a ball joint. The ball joint includes a socket defining a pivot center, a bearing in the socket, and a stud. The stud has a ball end portion received in the bearing and a shank portion projecting from the socket. The stud further has a longitudinal axis extending through the pivot center. The bearing supports the stud in the socket for pivotal movement and for rotational movement about the axis relative to the socket by a predetermined amount. The ball joint further includes an annular seal having first and second end portions and an intermediate portion. The seal is made from an elastic material. The first end portion of the seal is fixed to the socket. The second end portion of the seal is fixed to the shank portion of the stud and is pivotable and rotatable with the stud relative to the socket about the pivot center. The intermediate portion of the seal has a plurality of flutes that provide excess material to enable rotation of the stud about the axis relative to the socket by the predetermined amount.

BRIEF DESCRIPTION OF THE DRAWINGS

The foregoing and other features of the present invention will become apparent to those skilled in the art to which the present invention relates upon reading the following description with reference to the accompanying drawings, in which.

DETAILED DESCRIPTION OF THE INVENTION

Figure 1:
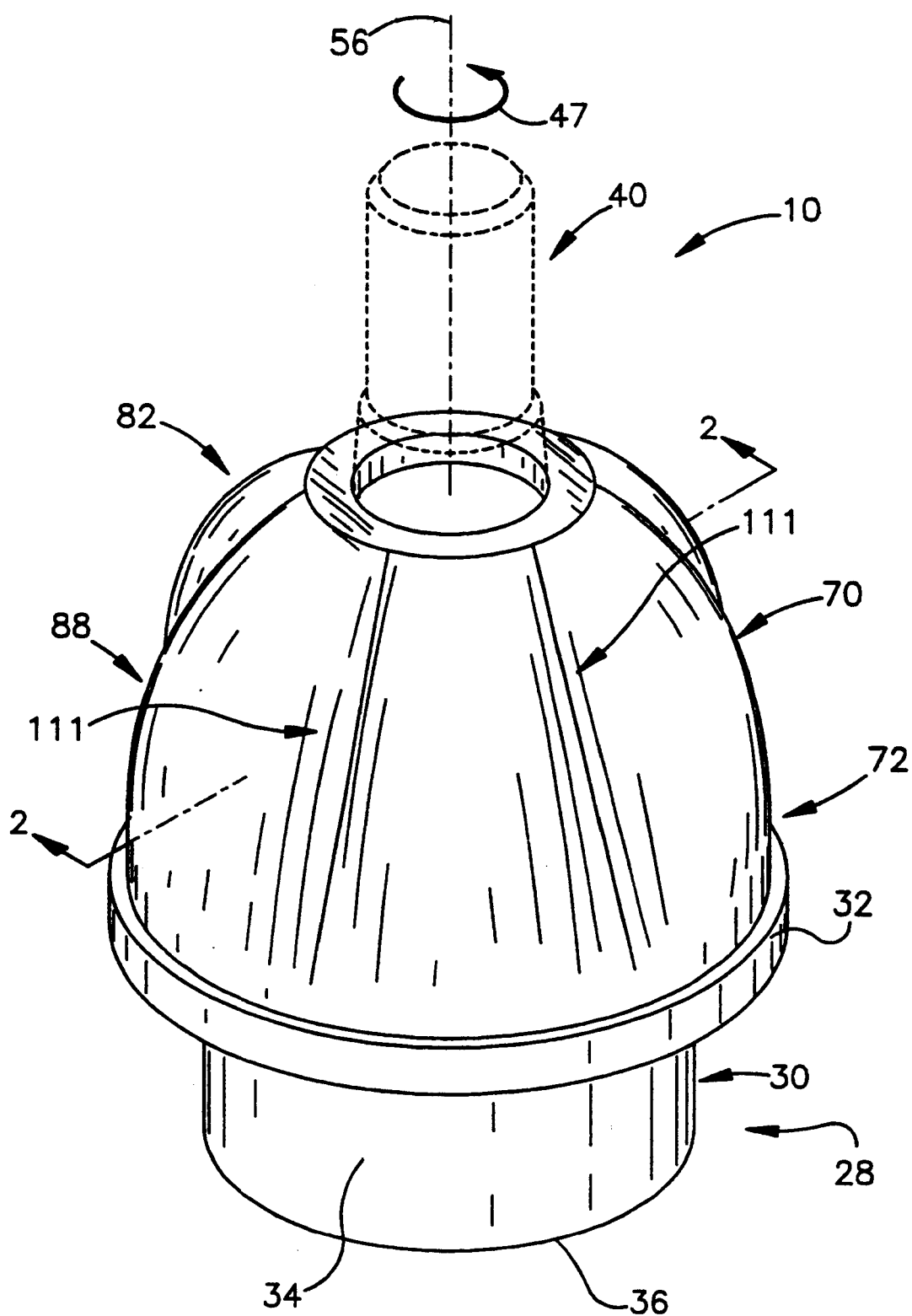
FIG. 1 is an isometric schematic view of a ball joint constructed in accordance with the present invention.

The present invention relates to a ball joint for supporting a first vehicle portion for movement relative to a second vehicle portion. The present invention is applicable to various ball joint constructions. As representative of the invention, FIG. 1 illustrates a ball joint 10.

The ball joint 10 is locatable between a first vehicle portion (not shown) and the second vehicle portion (not shown). The first vehicle portion may be a steering knuckle or steering yoke, for example. The second vehicle portion may be a control arm, steering yoke, or steering knuckle, for example.

The ball joint 10 includes a housing 28 defining a socket 30. A mounting flange 32 extends radially outward from a side wall 34 of the socket 30. The side wall 34 interconnects the mounting flange 32 and a closed lower end 36 of the socket 30. The socket 30 is typically mounted in a cylindrical opening in the first vehicle portion. A bearing 38 (FIG. 2) is located in the socket 30.

The ball joint 10 also includes a ball stud, or stud member, 40. A spherical portion, or ball end portion, 42 of the ball stud 40 is received by the bearing 38. The ball end portion 42 of the ball stud 40 is pivotable in the bearing 38, about a pivot center 45, to provide for relative pivotal movement between the first vehicle portion and the ball stud 40, as indicated by the arrow 49 (FIG. 2).

The ball stud 40 has a shank portion 50 that projects from the ball end portion 42. The shank portion 50 has a cylindrical first section 52 centered on a longitudinal central axis 56 of the ball stud 40. The first section 52 has a cylindrical outer surface 58. The shank portion 50 also has a second intermediate section 60 that has a tapered outer surface 68 symmetric about the axis 56. The shank portion 50 also has a third section 62 that has a cylindrical outer surface 69 that may be threaded.

Figure 2:
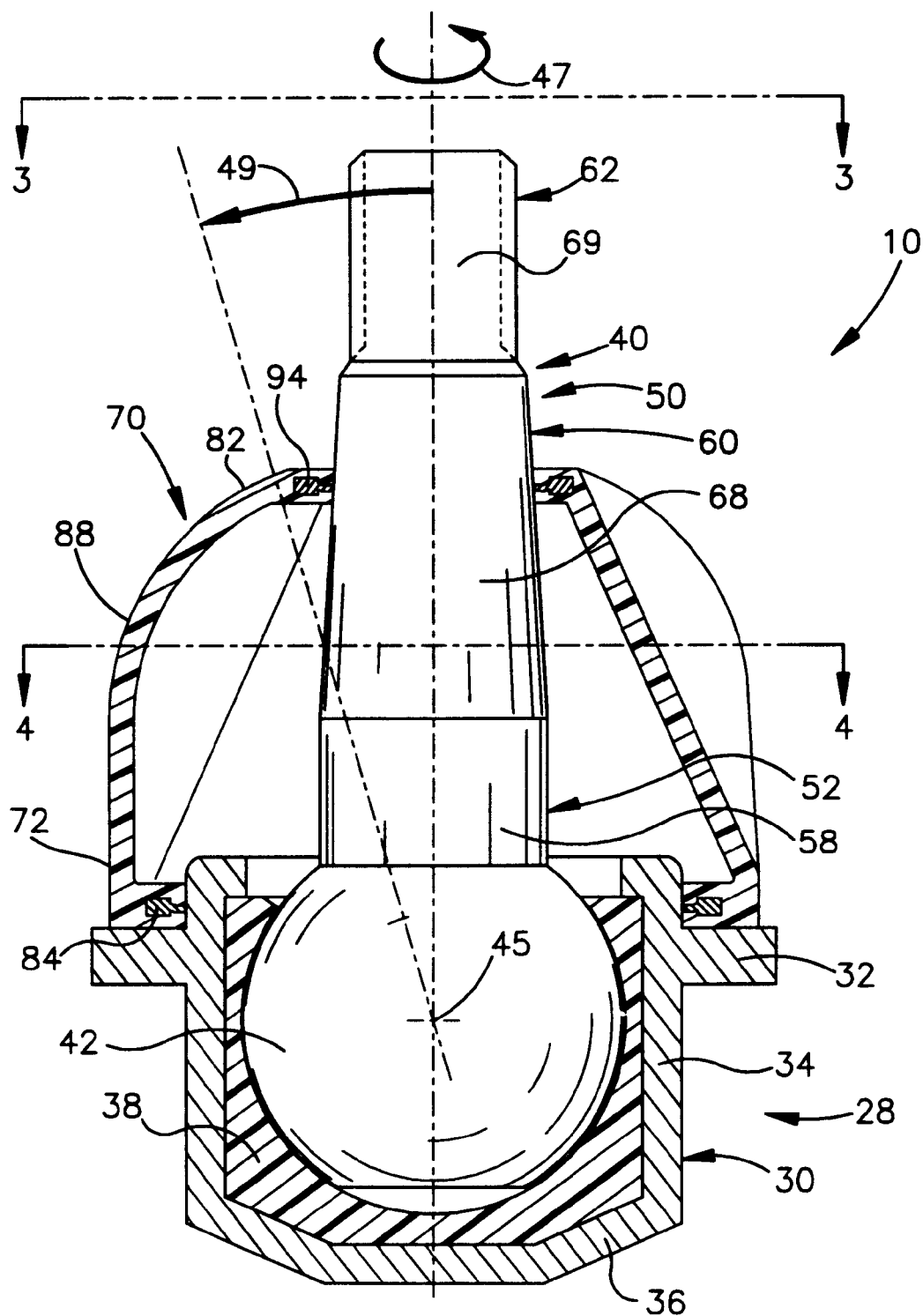
FIG. 2 is a sectional view taken along line 2—2 in FIGS. 1 and 4.

The ball stud 40 is rotatable in the bearing 38, about the axis 56, relative to the socket 30, as indicated by the arrow 47 (FIGS. 1 and 2). The ball stud 40 and the axis 56 are also pivotable within the bearing 38 about the pivot center 45.

When the ball joint 10 is assembled with the second vehicle portion, the tapered portion 60 of the shank portion 50 of the ball stud 40 is typically fitted in a tapered opening in the second vehicle portion in a tight, force-fitting connection. A nut (not shown) may be screwed on the third section 60 of the ball stud 40 to secure the connection.

The ball joint 10 further includes an annular seal 70. The seal 70 extends between the socket 30 and the second section 60 of the ball stud 40. The seal 70 has a first end portion 72 connected with the socket 30 and an opposite second end portion 82 connected with the ball stud 40. The seal 70 is made from an elastomeric material. The elastomeric material generally is selected to have good flex fatigue life, puncture resistance, and abrasion resistance, etc.

The first end portion 72 of the seal 70 is fixed to and seals against the socket 30. The first end portion 72 is fixed to the socket 30 with an integral washer 84, or other known device, such as a ring spring.

The second end portion 82 of the seal 70 is fixed to and seals against the shank portion 50 of the ball stud 40. The second end portion 82 of the seal 70 is connected to the shank portion 50 with an integral washer 94 or other known device, such as a ring spring. As a result, the second end portion 82 of the seal 70 is secured for rotation with the ball stud 40 about the axis 56.

The seal 70 also has an intermediate portion 88. The intermediate portion 88 extends between, and interconnects, the first end portion 72 of the seal 70 and the second end portion 82 of the seal. The intermediate portion 88 of the seal 70 forms a main body portion of the seal itself.

Figure 3:
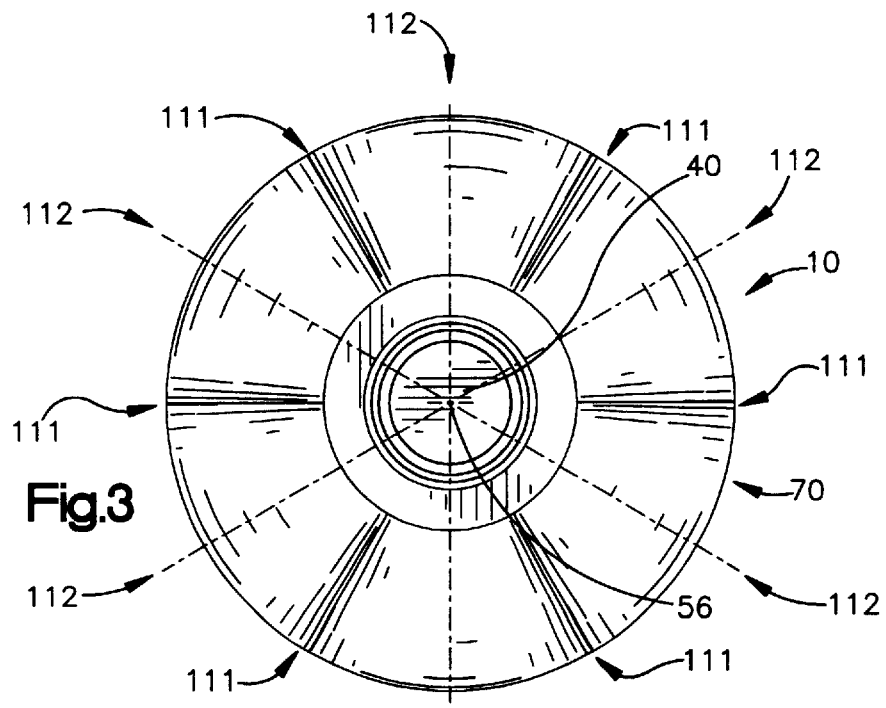
FIG. 3 is a sectional view taken along line 3—3 in FIG. 2.

The intermediate portion 88 of the seal 70 has a plurality of corrugations, grooves, or flutes 111. Each flute 111 extends circumferentially between a pair of adjacent exterior vertices 112, as shown by the radial dash-dot lines in FIG. 3.

Figure 4:
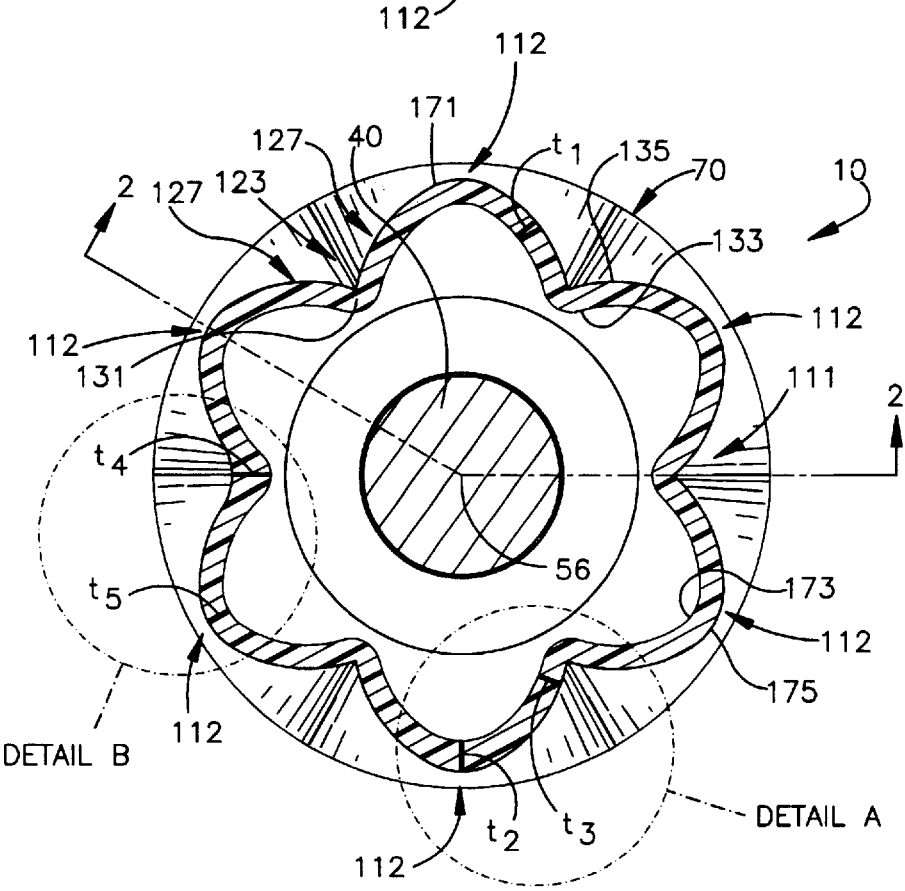
FIG. 4 is a sectional view taken along line 4—4 in FIG. 2.
Figure 6:
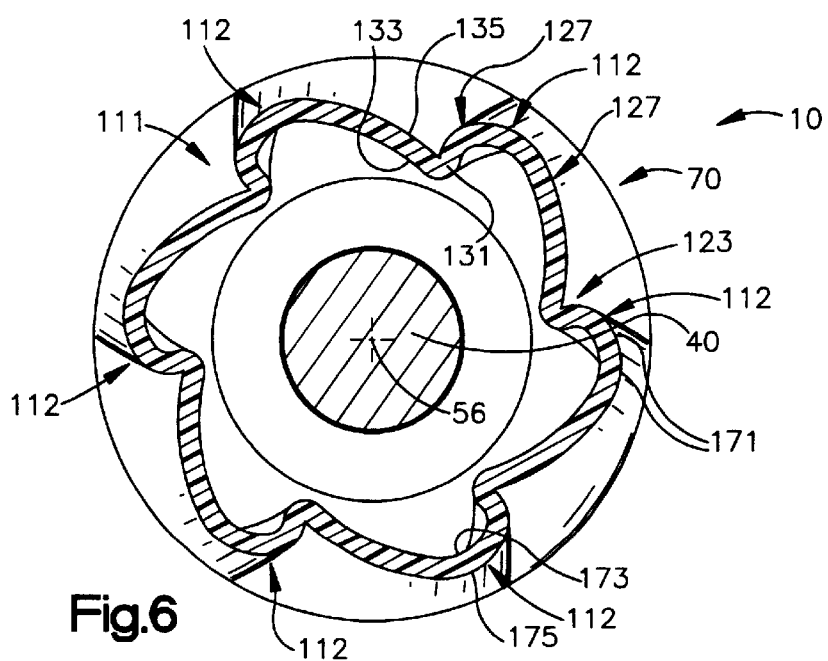
FIG. 6 is a sectional view taken along line 6—6 in FIG. 5.

In the areas of the flutes 111, the material of the seal 70 has a uniform thickness $t_1$ (FIGS. 4 and 6). The flutes 111 provide excess material in the intermediate portion 88 of the seal 70 for enabling rotation of the stud 40 about the axis 56 relative to the socket 30 by a predetermined amount, without overstressing the material of the seal. In the illustrated embodiment, six flutes 111 are provided, although other embodiments could have a different number of flutes.

When the seal 70 is in the initially assembled, or neutral, position, shown in FIGS. 1–4, the flutes 111 have a linear configuration extending downward and away from the axis 56 in a direction from the connection of the seal 70 at the first section 52 of the ball stud 40 to the connection of the seal at the socket 30.

Each flute 111 includes a trough portion 123 interposed between two crest portions 127, when viewed in cross-section (FIG. 4). Each trough portion 123 is located closer to the axis 56 than the adjoining crest portions 127.

Each trough portion 123 has an interior vertex portion 131 that defines the closest point of the seal 70 to the axis 56. Each trough portion 123 has an interior, V-shaped surface 133 and an exterior V-shaped surface 135, each of which extends away from the axis 56 as it moves away from the vertex portion 131, as viewed in FIG. 4.

Each crest portion 127 extends away from its associated trough portion 123 and merges with a crest portion 127 from an adjacent flute 111, at an exterior vertex 112. Each vertex 112 defines the farthest point of the seal 70 from the axis 56. Each crest portion 127 has a rounded exterior surface 175 that is interconnected with the exterior surface 175 from an adjacent flute 111 to define a rounded off, "hump-back" configuration that is concave relative to the axis 56. Each crest portion 127 also has a concave surface 173 presented toward the axis 56. The interior surface 173 and the exterior surface 175 both extend away from the axis 56 in a direction toward a crest portion 127 of an adjacent flute 111, as viewed in FIG. 4.

FIGS. 1–4 show the ball joint in a neutral condition. The ball stud 40 is not rotated relative to the socket 30 about the axis 56, nor is the ball stud pivoted about the pivot center 45. The flutes 111 are in a linear condition.

Figure 5:
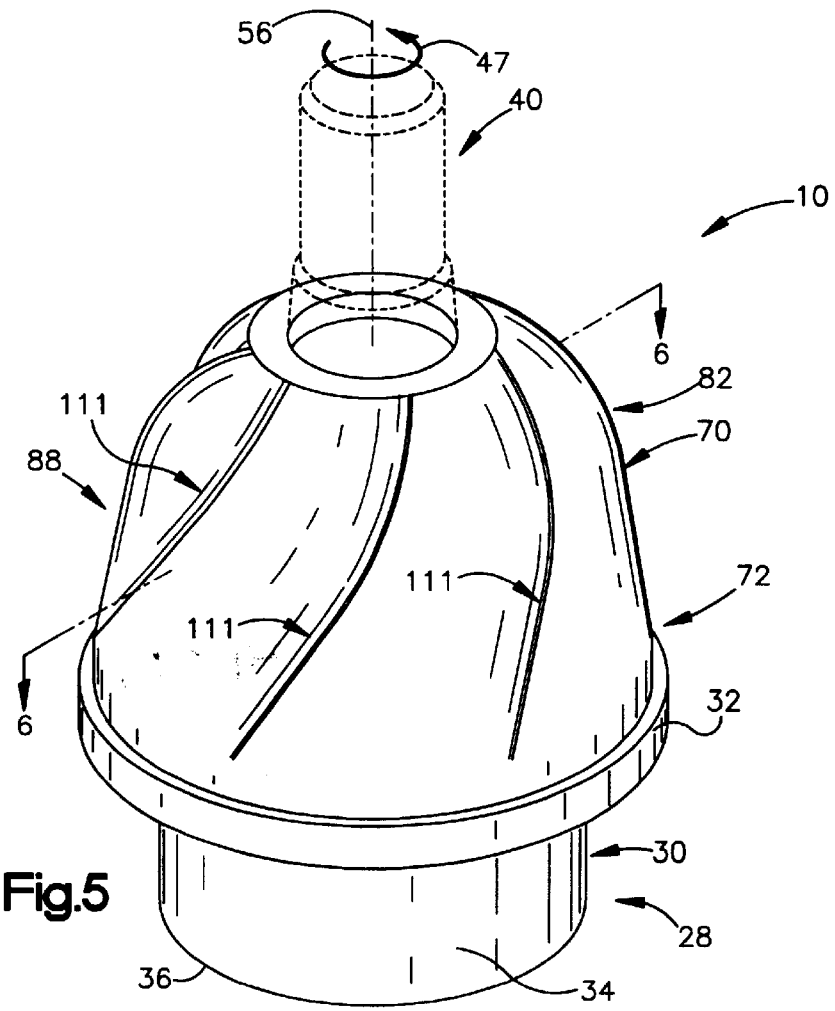
FIG. 5 is an isometric schematic view of the ball joint of FIG. 1 under a different condition.

When the ball stud 40 is twisted, or rotated, about the axis 56 relative to the socket 30 from the neutral position, the flutes 111 of the seal 70 take on a curved configuration, as viewed in FIG. 5, as the intermediate portion 88 of the seal is torsionally stressed. This twisting may occur repeatedly as the ball stud 40 rotates first one way, and then the other, while the ball joint 10 performs its function of allowing relative movement between the first and second vehicle portions.

This repeated, or cyclic, twisting in a ball joint may cause a conventional seal to fail (i.e., leak, rip, tear, etc.) even though the conventional seal never incurs a stress equal to, or greater than, the ultimate stress of the material of construction of the conventional seal. This type of failure is known as fatigue failure.

In fatigue failure, the material of construction gradually deteriorates when subjected to repeated loads. By reducing the magnitude of repeated stress incurred by a seal, a value can be found that will not produce failure, regardless of the number of applied cycles of loading incurred by the seal. This stress value is known as the fatigue limit or fatigue point of the seal material.

In the ball joint 10 of the preferred embodiment, the flutes 111 of the intermediate portion 88 of the seal 70 reduce the stress incurred by the seal so that the fatigue limit of the material of construction of the seal is not reached over the operational life of the ball joint. Merely making a conventional seal thicker could reduce stress in the seal, but would create an undesirably large resistance to movement for the ball joint. The flutes 111 allow the thickness of the seal 70 to be similar to conventional values, thereby maintaining a low resistance to movement, or low stiffness.

The flutes 111 reduce the stress incurred by the seal 70 by allowing the excess material of the flutes to withstand the cyclic loading and maintain stresses below a predetermined fatigue limit of the material of construction. The fluted configuration of the seal 70 may allow rotation, or twisting, about the axis 56 of up to 20° to 35° or more in each direction of rotation about the axis 56.

Because the flutes 111 allow the seal 70 to flex without being overstressed, the end portions 72 and 82 of the seal can be fixed to the ball stud 40 and socket 30 of the ball joint 10, respectively. Fixing the seal 70 to the ball stud 40 and socket 30 can help to seal in lubricant and keep out environmental contaminants.

Additionally, when the ball stud 40 is twisted about the axis 56 relative to the socket 30 from the neutral position, portions of the flutes 111 take on a "breaking wave" configuration in cross section, as can be seen in FIG. 6. One crest portion 127 of each flute 111 incurs a bending, or compressing, force that causes that crest portion to increase its curvature. The other crest portion 127 incurs a stretching, or tensioning, force that causes that other crest portion to decrease its curvature. As a result, each vertex 112 rotates about the axis 56 relative to both the socket 30 and the ball stud 40.

When the ball stud 40 pivots in the direction of arrow 49 about a horizontal axis, the flutes 111 of the intermediate portion 88 incur additional bending and stretching forces as one side (the left side as viewed in FIG. 2) is axially compressed and the other side (the right side as viewed in FIG. 2) is axially tensioned. This additional stress may be mitigated by a conventional means such as horizontal bellows (not shown) in the first end portion 72 and/or second end portion 82 of the seal 70.

As discussed above, the intermediate portion 88 of the seal 70 has a uniform material thickness. As another alternative, as shown in Detail A of FIG. 4, the crest portions 127 of each flute 111 may have thicknesses $t_2$ greater than corresponding thicknesses $t_3$ of the trough portions 123. This configuration concentrates the deflection of the seal 70, during twisting, at the trough portions 123 since the smaller thicknesses $t_3$ of the trough portions have lower rotational stiffnesses than the thicknesses $t_2$ of the distal portions 171.

As yet another alternative, as shown in Detail B of FIG. 4, the trough portions 123 of each flute 111 may have thicknesses $t_4$ greater than corresponding thicknesses $t_5$ of the distal portions 171. This configuration concentrates the deflection of the seal 70, during twisting, at the distal portions 171 since the smaller thicknesses $t_5$ of the distal portions have lower rotational stiffnesses than the thicknesses $t_4$ of the trough portions 123.

Still further, a seal 70 in accordance with the present invention may have a combination of the thicker trough portions 123, the thicker distal portions 171, or uniformly thick flutes 111. For example, a seal 70 may have flutes 111 that alternate thicker trough portions 123 and thicker distal portions 171.

The elastomeric material of the seal 70 may be any suitable elastic or resilient material, as discussed above. Typically a synthetic rubber or a polymeric material such as urethane or polyurethane is used.

From the above description of the invention, those skilled in the art will perceive improvements, changes and modifications in the invention. Such improvements, changes and modifications within the skill of the art are intended to be covered by the appended claims.

Having described the invention, I claim:

1. A ball joint comprising:

a socket;

a bearing in said socket, said bearing defining a pivot center; and a stud having a ball end portion received in said bearing and a shank portion projecting from said socket, said stud having a longitudinal axis extending through said pivot center, said bearing supporting said stud in said socket for pivotal movement about said pivot center and for rotational movement about said axis relative to said socket by a predetermined amount, said ball joint further comprising an annular seal having an intermediate portion extending between first and second end portions of said seal, said seal being made from an elastic material, said first end portion of said seal being fixed to said socket and forming a widest portion of said seal, said second end portion of said seal being fixed to said shank portion of said stud and forming a narrowest portion of said seal, said second end portion of said seal being pivotable and rotatable with said stud relative to said socket, said intermediate portion of said seal having a plurality of flutes that provide excess material to enable rotation of said stud about said axis relative to said socket by said predetermined amount;

each flute of said plurality of flutes including a trough portion interposed between two crest portions, a vertex portion of said trough portion forming a radially innermost portion of said flute, said vertex portion of said trough portion extending axially between said first and second end portions of said seal in a substantially straight line and at a constant angle relative to said axis.

2. The ball joint as set forth in claim 1 wherein said plurality of flutes includes first and second flutes located on opposite sides of said axis, said first flute including a trough portion with a first vertex portion and said second flute including a trough portion with a second vertex portion, said first and second vertex portions and said axis being located in a common plane such that said first and second vertex portions, in cross-section, form a conical shape about said axis.

3. The ball joint as set forth in claim 1 wherein each crest portion of said flute includes a vertex that forms a radially outermost portion of said flute, said vertex of each crest portion extending parallel to said axis over approximately one-half of an axial length of said seal.

4. The ball joint as set forth in claim 3 wherein said vertex of each crest portion is dome shaped and extends axially away from said first end portion of said seal and curves radially inwardly adjacent said second end portion of said seal.

5. The ball joint as set forth in claim 1 wherein each crest portion of said flute includes a rounded exterior surface, said rounded exterior surface diverging and increasing in circumferential size as said crest portion extends axially from said second end portion of said seal toward said first end portion of said seal so that a widest portion of said rounded exterior surface is located adjacent said first end portion.

6. The ball joint as set forth in claim 1 wherein said predetermined amount of rotation of said stud relative to said socket is an amount in the range of plus or minus about 20 degrees.

7. The ball joint as set forth in claim 1 wherein said predetermined amount of rotation of said stud relative to said socket is an amount in the range of plus or minus about 35 degrees.

8. The ball joint as set forth in claim 1 wherein said trough portion of said flute has a material thickness that is greater than a material thickness of said crest portions.

9. The ball joint as set forth in claim 1 wherein said trough portion of said flute has a material thickness that is less than a material thickness of said crest portions.

10. The ball joint as set forth in claim 1 wherein the plurality of flutes includes a total of six flutes, said flutes being equally spaced from one another about a circumference of said seal.

* * * * *